United States Patent Office 3,021,420
Patented Feb. 13, 1962

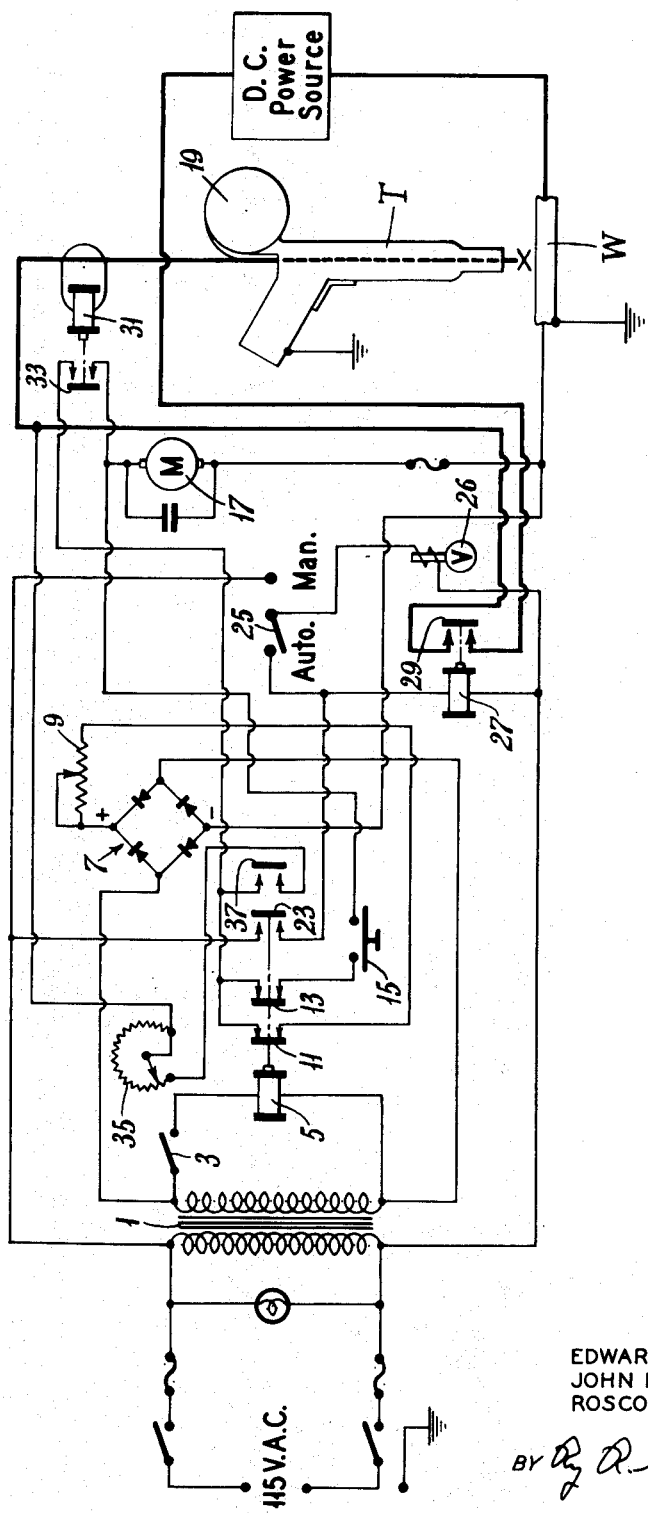

3,021,420
WELDING CONTROL CIRCUIT
Edward J. Ruland, Jr., West Caldwell, John P. C. Allen and Roscoe R. Lobosco, Fanwood, N.J., assignors to Union Carbide Corporation, a corporation of New York
Filed Sept. 15, 1959, Ser. No. 840,093
2 Claims. (Cl. 219—131)

This invention relates to an improved control circuit for use with automatic gas shielded consumable metal arc-welding apparatus. More particularly, it relates to a circuit for controlling the electrode feed rate of such apparatus.

There is a growing need in the welding trade for light portable consumable metal arc welding outfits utilizing gas shielding. Accordingly, a great many companies have been offering this type of unit to the trade in ever increasing numbers. In such apparatus everything necessary for the welding operation must of course be portable such as gas supply, welding current generator, control equipment and the torch itself. Also, since these units are being marketed as low cost equipment to small jobbers, any means of keeping cost of production down is of considerable importance.

The control circuits used with these portable units conventionally must provide means for initially advancing the consumable wire electrode (usually mounted on the torch itself) to a point where an arc may be struck between the electrode and the workpiece usually referred to as "inching," means for initiating the arc by closing the welding current circuit, and means for automatically controlling the wire electrode feed rate during welding. Equipment presently available for such control purposes although labeled portable is still somewhat bulky and difficult to move due to the great number of heavy weight components utilized therein.

It is an object of this invention to provide a portable metal arc welding unit of lighter weight and lower cost than presently available units.

It is a further object to achieve savings in both weight and cost of the equipment by providing a simplified welding control circuit.

Other objects and advantages will be obvious from the description and drawing which shows a schematic diagram of a preferred form of the instant invention.

The objects of the invention are accomplished in general by an improvement in a portable, gas shield, consumable electrode electric-arc welding apparatus including a hand torch, electrode feed means, a welding current source, and a control circuit, said improvement comprising single transformer means within the control circuit for supplying power for electrode "inching" and for controlling the weld current supply.

The present invention resides in the control circuit which is used in conjunction with a direct-current type of welding power supply. The voltage which appears across the welding arc is used as the control circuit to power a direct-current motor to drive feed rolls which automatically feed a consumable wire electrode at the proper rate. When a constant current type of D.C. power supply is used, as the name implies, the current remains relatively constant at different voltages. When the arc voltage increases, the motor speed will increase; and, therefore, the amount of consumable electrode being fed into the weld will increase. When the arc voltage decreases the reverse will occur. When a constant voltage type of D.C. power supply is used, as the name implies, the voltage remains relatively constant at different currents. When the voltage applied to the motor is decreased by means of a variable resistance in the motor circuit the amount of consumable electrode being fed into the weld will decrease and therefore the amount of arc current will decrease. When the voltage applied to the motor is increased the reverse will occur.

The control circuit comprises a circuit for inching the consumable wire electrode which includes an A.C. power source and a rectifier for converting same to D.C. to operate the wire electrode feed means, means operative with the weld current generator to automatically determine the wire feed rate during normal welding operations and further circuit means for controlling the closing of the welding current circuit to initiate and maintain an arc. This latter circuit means also requires an A.C. source for energization.

The present invention uses a single A.C. current source in the form of a transformer to energize both the inching circuit and the welding current supply circuit. The single transformer employed in this circuit may be an inexpensive filament-supply type transformer, although not usually employed to supply an A.C. voltage to a rectifier due to poor regulation, in this case, since the rectified A.C. is used to power the D.C. permanent magnetic motor when inching wire wherein rate of feed is not critical and since the transformer has no effect on the normal wire feed rate, its regulation is not critical.

The operation of the control circuit of the invention will now be set forth with reference to the drawing. The primary winding of transformer 1 is connected across a main 115 volt A.C. line. The secondary of transformer 1 is connected in circuit relation with trigger switch 3 and the coil of weld relay 5. Also connected in circuit relation with the secondary of the transformer 1 is a selenium rectifier 7.

In operation, when inching wire, voltage from the secondary of transformer 1 is supplied to rectifier 7 which changes the A.C. to D.C. and supplies the D.C. through variable resistor 9, through normally closed contacts 11 of weld start relay 5, through a second pair of normally closed contacts 13 of weld start relay 5. Then current flows through "inch" push button 15 to wire feed motor 17 which drives feed rolls in the torch which inches wire from spool 19. The motor 17 is a permanent magnet type motor which functions similar to a shunt motor.

After inching the wire and after the "inch" push button 15 is released and a weld is ready to be made, the trigger switch 3 is closed, completing a circuit from the secondary of the same transformer 1 to weld start relay 5.

Weld start relay 5 being energized, normally open contacts 23 of weld start relay 5 close, completing a circuit from the main A.C. line through the now closed contacts 23, through switch 25 which is in the automatic position to open the solenoid gas valve 26 and through the welding contact relay 27 to the other side of the line.

Welding contact relay 27, being energized, the contacts 29 associated therewith close, and welding power from a D.C. power source is impressed across the torch or hand gun T and workpiece W. When an arc is struck, current flows from the power supply to the torch across the arc to the work and back to the power supply. Welding current energizes welding current relay 31 which closes contacts 33, completing a circuit from one side of the D.C. power supply through welding contacts 29, through variable resistor 35, through closed contacts 37 associated with weld start relay, through closed contact 33, through motor 17, back to the work W and the other side of the power supply. The setting of the variable resistor 35 controls the basic speed of motor 17, which in turn controls wire feed speed.

As stated previously, upon energization of the weld start relay 5, the normally closed contacts 11 and 13 of such relay are opened, automatically opening the "inching" circuit regardless of the position of "inch" button 15.

The circuit of the present invention produces sizeable cost and weight savings in the complete welding apparatus as power transformers are both heavy and expensive. Utilization of the invention by manufacturers will result in their having a considerable advantage in this highly competitive field over manufacturers not using same.

It is to be understood that the circuit set forth and described in the specification with reference to the drawing is a preferred embodiment of the invention. Certain changes and substitutions may be made therein by a person skilled in the art without departing from the spirit and scope of the invention.

What is claimed is:

1. An improved welding control circuit for use with a gas shielded consumable metal arc welding apparatus, including a welding current generator and a torch, said circuit comprising an A.C. power inlet adapted to be connected to an A.C. power source, a single transformer having its primary winding connected to said power inlet, means manually energized from the secondary winding of said transformer causing an electrode to be advanced a desired distance prior to initiation of the arc, means also energized from the secondary winding of said transformer for initiating the flow of welding current from the welding current generator, and means energized by said generator for automatically initiating and controlling the electrode feed rate during welding.

2. A welding control circuit for use with a portable gas shielded consumable electrode arc welding apparatus including a hand gun with electrode storage and feeding means mounted thereon and a D.C. welding current generator said circuit comprising an A.C. power inlet, adapted to be connected to an A.C. power source, a single transformer having its primary connected to said power inlet, an inching circuit for manually advancing the electrode which comprises a full wave rectifier connected across the secondary of the transformer, the output of said rectifier being fed to the electrode feeding means through a manually operated switch and two normally closed contacts of a first relay means, said first relay means being connected to the secondary of the transformer through a second manually operable switch and having two pairs of normally open contacts the first of which energizes a second relay and an electro-magnetic shielding gas valve through a third manually operated switch from the A.C. power inlet, the second pair of contacts being in series with a circuit supplying D.C. power to the electrode feeding means from the welding current generator, the second relay having a normally open contact associated therewith for completing the welding current circuit for initiating the welding arc, and third relay means operated by the welding current having associated contacts in series with circuit for supplying D.C. power from the welding current generator to the electrode feeding means whereby during a welding operation the circuit supplying D.C. power to the electrode feeding means is in parallel with the welding arc.

References Cited in the file of this patent

UNITED STATES PATENTS

| | | |
|---|---|---|
| 2,488,987 | Schwerber | Nov. 22, 1949 |
| 2,843,727 | Benz et al. | July 15, 1958 |
| 2,845,524 | Morley et al. | July 29, 1958 |

Notice of Adverse Decision in Interference

In Interference No. 93,574 involving Patent No. 3,021,420, E. J. Ruland, Jr., J. P. C. Allen and R. R. Lobosco, Welding control circuit, final judgment adverse to the patentees was rendered July 15, 1964, as to claim 1.

[*Official Gazette October 27, 1964.*]